(12) United States Patent
Jiang et al.

(10) Patent No.: US 8,559,990 B2
(45) Date of Patent: Oct. 15, 2013

(54) APPARATUS AND METHOD FOR ENABLING UPLINK BEAMFORMING TRANSIT DIVERSITY CHANNEL ESTIMATION

(75) Inventors: Yibo Jiang, San Diego, CA (US); Sharad Deepak Sambhwani, San Diego, CA (US); Jilei Hou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 13/019,456

(22) Filed: Feb. 2, 2011

(65) Prior Publication Data
US 2011/0195734 A1    Aug. 11, 2011

Related U.S. Application Data

(60) Provisional application No. 61/302,058, filed on Feb. 5, 2010.

(51) Int. Cl.
*H04B 1/00* (2006.01)
*H04B 7/00* (2006.01)
*H04B 7/02* (2006.01)
*H03C 7/02* (2006.01)
*H04M 1/00* (2006.01)

(52) U.S. Cl.
USPC ............ 455/500; 455/69; 455/101; 455/561; 375/267

(58) Field of Classification Search
USPC ............ 455/101, 132–140, 272, 275–277.2, 455/561, 562.1, 69; 375/267, 299, 347
See application file for complete search history.

(56) References Cited

U.S. PATENT DOCUMENTS

| | | | |
|---|---|---|---|
| 6,754,473 B1 * | 6/2004 | Choi et al. | 455/101 |
| 7,054,664 B2 * | 5/2006 | Nagaraj | 455/562.1 |
| 7,088,289 B1 * | 8/2006 | Peltola | 342/377 |
| 7,212,838 B2 | 5/2007 | Raghothaman | |
| 7,327,799 B2 * | 2/2008 | Matsumoto | 375/267 |
| 7,403,748 B1 * | 7/2008 | Keskitalo et al. | 455/101 |
| 2001/0031647 A1 | 10/2001 | Scherzer et al. | |
| 2002/0044591 A1 * | 4/2002 | Lee et al. | 375/130 |
| 2003/0017835 A1 * | 1/2003 | Bergel | 455/502 |
| 2003/0099216 A1 * | 5/2003 | Nilsson et al. | 370/335 |

(Continued)

FOREIGN PATENT DOCUMENTS

| | | |
|---|---|---|
| WO | WO2008023332 A2 | 2/2008 |
| WO | WO2008051812 A2 | 5/2008 |

OTHER PUBLICATIONS

Petri Komulainen, et al. (2009) Downlink assisted uplink zero-forcing for TDD multiuser MIMO systems. IEEE Wireless Communications and Networking Conference, Budapest, Hungary, Apr. 5-8.

(Continued)

*Primary Examiner* — Simon Nguyen
(74) *Attorney, Agent, or Firm* — Darren M. Simon

(57) ABSTRACT

A method and apparatus for enabling uplink beamforming transmit diversity channel estimation is provided. The method may include receiving a primary pilot channel and a secondary pilot channel, deriving two or more composite channels from the received primary and secondary pilot channels, deriving two or more physical channels from the derived two or more composite channels, and synthesizing a composite channel estimate for a dominant virtual antenna from the two or more derived physical channels and a beamforming weight vector.

46 Claims, 9 Drawing Sheets

(56) References Cited

U.S. PATENT DOCUMENTS

| | | |
|---|---|---|
| 2003/0124994 A1* | 7/2003 | Ylitalo .................... 455/91 |
| 2004/0077378 A1* | 4/2004 | Kim et al. ............... 455/562.1 |
| 2004/0091026 A1* | 5/2004 | Nakayama .............. 375/148 |
| 2004/0147234 A1* | 7/2004 | Lin et al. ................. 455/101 |
| 2004/0235526 A1* | 11/2004 | Kaipainen et al. ...... 455/561 |
| 2006/0233224 A1* | 10/2006 | Lotter et al. ............ 375/148 |
| 2008/0080633 A1* | 4/2008 | Botha et al. ............. 375/267 |
| 2008/0205552 A1 | 8/2008 | Sartori et al. |
| 2008/0298264 A1 | 12/2008 | Ramesh et al. |
| 2009/0185650 A1 | 7/2009 | Ravid et al. |
| 2009/0191835 A1 | 7/2009 | Lozano et al. |
| 2010/0220811 A1* | 9/2010 | Semenov et al. ........ 375/296 |
| 2010/0311343 A1* | 12/2010 | Keerthi ................... 455/63.1 |
| 2012/0063540 A1* | 3/2012 | Aoki ....................... 375/295 |

OTHER PUBLICATIONS

Wireless Information Transmission System Lab., Channel estimation, National Sun Yat-sen University, pp. 1-37.

International Search Report and Written Opinion—PCT/US2011/023785, ISA/EPO—Jul. 6, 2011.

QUALCOMM Incorporated: "On the benefits of Uplink Closed Loop Transmit Diversity", 3GPP Draft; R1-104737_0N the Benefits of UL CLTD, 3rd Generation Partnership Project (3GPP), Mobile Competence Centre; 650, Route Des Lucioles; F-06921 Sophia-Antipolis Cedex; France, vol. RAN WGI, No. Madrid, Spain; 20100823, Aug. 17, 2010, XP050449978, [retrieved on Aug. 17, 2010].

* cited by examiner

APPARATUS AND METHOD FOR ENABLING UPLINK BEAMFORMING TRANSIT DIVERSITY CHANNEL ESTIMATION

CROSS-REFERENCE TO RELATED APPLICATION(S)

This application claims the benefit of U.S. Provisional Patent Application Nos. 61/302,058, titled "APPARATUS AND METHOD FOR ENABLING UPLINK BEAMFORMING TRANSIT DIVERSITY CHANNEL ESTIMATION," filed on Feb. 5, 2010, which is expressly incorporated by reference herein in its entirety.

BACKGROUND

1. Field

Aspects of the present disclosure relate generally to wireless communication systems, and more particularly, for enabling uplink beamforming transmit diversity channel estimation.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, orthogonal frequency division multiple access (OFDMA) systems, and high speed packet access (HSPA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

Generally, in a closed loop transmit diversity (CLTD) beamforming scheme for cellular systems, where two pilot channels are sent on two eigenmodes (e.g. two orthogonal beamforming vectors), due to fluctuation of beamforming phase and/or amplitude from slot to slot, channel estimation for demodulation by a pilot filter working on a primary pilot channel may observe performance loss.

Thus, improved apparatuses and methods for channel estimation in CLTD beamforming schemes are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described for enabling uplink beamforming transmit diversity channel estimation. According to one aspect, a method for enabling channel estimation by a base station is provided. The method can include receiving a primary pilot channel and a secondary pilot channel. Further, the method can comprise deriving two or more composite channels from the received primary and secondary pilot channels. Still further, the method can comprise deriving two or more physical channels from the derived two or more composite channels. Moreover, the method can comprise synthesizing a composite channel estimate for a dominant virtual antenna from the two or more derived physical channels and a beamforming weight vector.

Another aspect relates to a computer program product comprising a computer-readable medium. The computer-readable medium including code executable to receive a primary pilot channel and a secondary pilot channel. Further, the computer-readable medium comprises code executable to derive two or more composite channels from the received primary and secondary pilot channels. Still further, the computer-readable medium comprises code executable to derive two or more physical channels from the derived two or more composite channels. Moreover, the computer-readable medium including code executable to synthesize a composite channel estimate for a dominant virtual antenna from the two or more derived physical channels and a beamforming weight vector.

Yet another aspect relates to an apparatus. The apparatus can comprise means for receiving, by a base station, a primary pilot channel and a secondary pilot channel. Further, the apparatus can comprise means for deriving two or more composite channels from the received primary and secondary pilot channels. Still further, the apparatus can comprise means for deriving two or more physical channels from the derived two or more composite channels. Moreover, the apparatus can comprise means for synthesizing a composite channel estimate for a dominant virtual antenna from the two or more derived physical channels and a beamforming weight vector.

Another aspect relates to an apparatus. The apparatus can include a processor, configured to receive a primary pilot channel and a secondary pilot channel, derive two or more composite channels from the received primary and secondary pilot channels, derive two or more physical channels from the derived two or more composite channels, and synthesize a composite channel estimate for a dominant virtual antenna from the two or more derived physical channels and a beamforming weight vector. Further, the apparatus can include a memory coupled to the processor for storing data.

Still another aspect relates to an apparatus. The apparatus can a receiver operable for receiving module for a primary pilot channel and a secondary pilot channel. Further, the apparatus can include a channel estimation module for: deriving two or more composite channels from the received primary and secondary pilot channels, deriving two or more physical channels from the derived two or more composite channels, and synthesizing a composite channel estimate for a dominant virtual antenna from the two or more derived physical channels and a beamforming weight vector.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
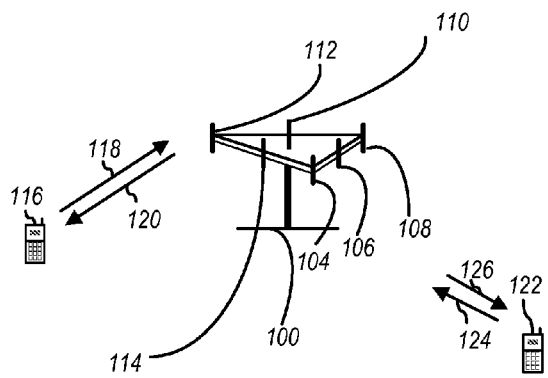
FIG. 1 illustrates a multiple access wireless communication system according to one embodiment.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
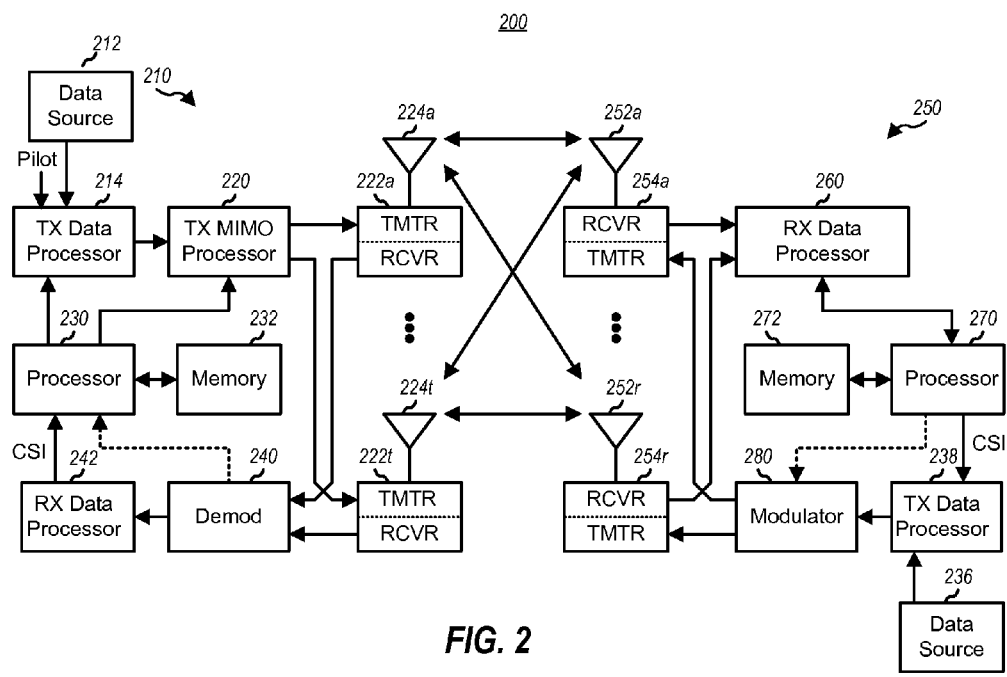
FIG. 2 illustrates a block diagram of a communication system.

FIG. 2 is a block diagram of an embodiment of a transmitter system 210 (also known as the access point) and a receiver system 250 (also known as access terminal) in a MIMO system 200. In one aspect, system 200 may be used to implement one or more mobile transmit diversity schemes. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

Figure 3:
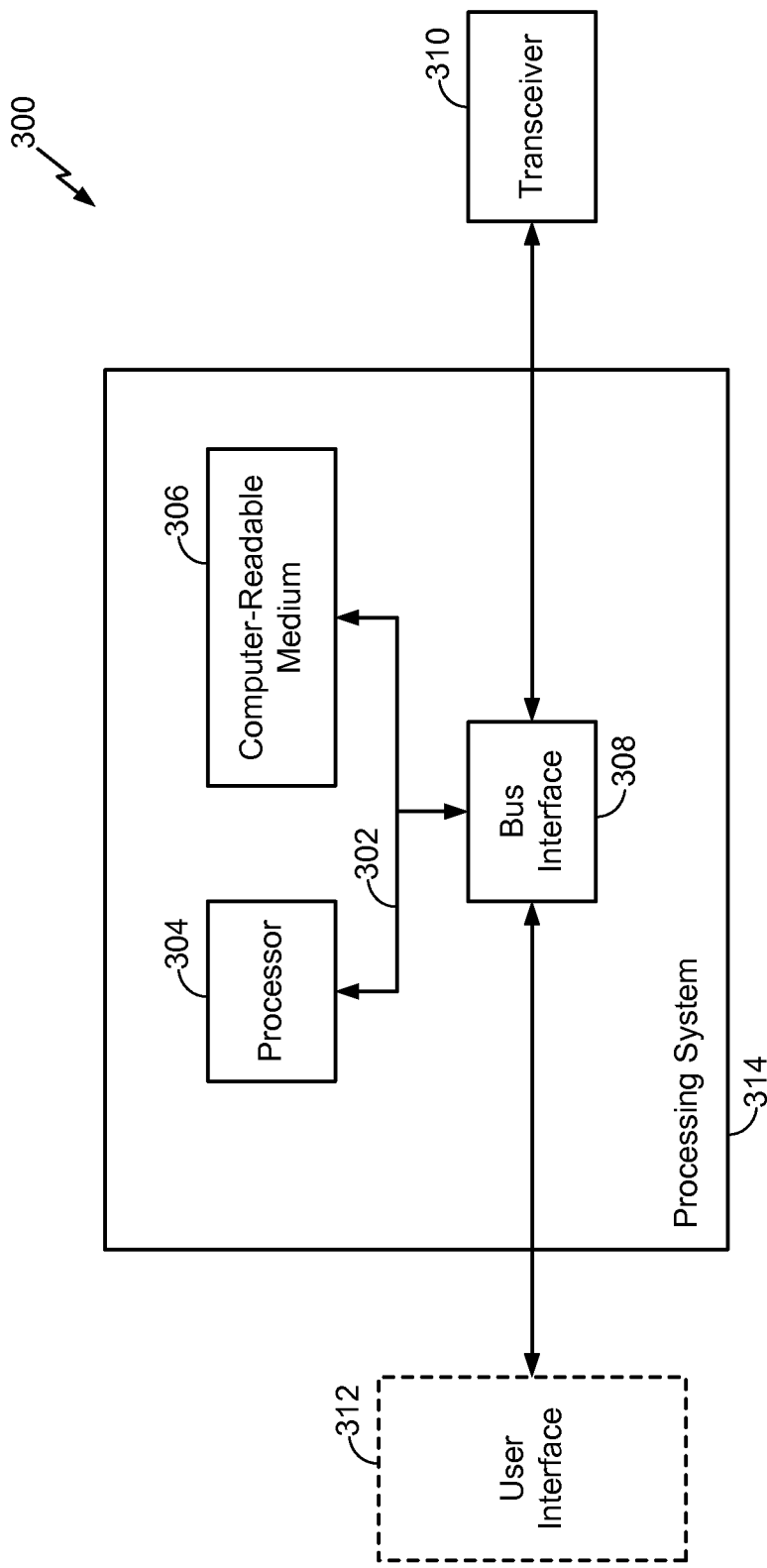
FIG. 3 is a diagram illustrating an example of a hardware implementation for an apparatus employing a processing system.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCHMBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCHPhysical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel FIG. 3 is a conceptual diagram illustrating an example of a hardware implementation for an apparatus 300 employing a processing system 314. In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors, represented generally by the processor 304, and computer-readable media, represented generally by the computer-readable medium 306. The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described infra for any particular apparatus. The computer-readable medium 306 may also be used for storing data that is manipulated by the processor 304 when executing software.

Further, processor 304 can provide means for receiving, by a base station, a primary pilot channel and a secondary pilot channel, means for deriving two or more composite channels from the received primary and secondary pilot channels, means for deriving two or more physical channels from the derived two or more composite channels, and means for synthesizing a composite channel estimate for a dominant antenna from the two or more derived physical channels and a beamforming weight vector. In one aspect, processor 304 may further provide means for receiving data and control channels from a user equipment, and means for demodulating the data and control channels using the synthesized composite channel estimate. In another aspect, processor 304 may further provide means for averaging at least one of the derived physical channels over multiple slots. In another aspect, processor 304 may further provide means for generating the beamforming weight vector from the received primary and secondary pilot channels. In another aspect, processor 304 may further provide means for transmitting the beamforming weight vector to a UE. In such an aspect, the beamforming weight vector may be transmitted using a fractional dedicated physical channel.

Figure 4:
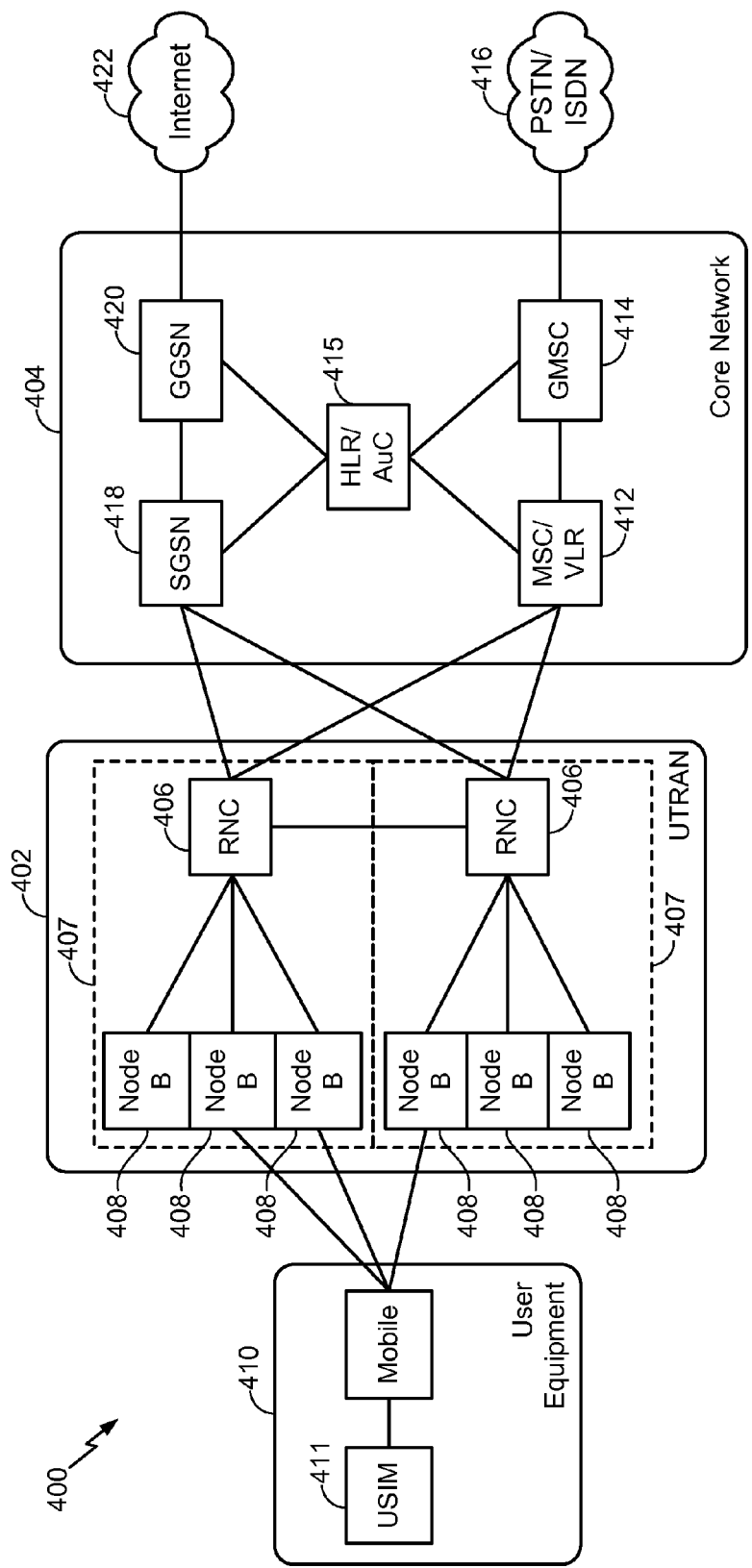
FIG. 4 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 4 are presented with reference to a UMTS system 400 employing a W-CDMA air interface. A UMTS network includes three interacting domains: a Core Network (CN) 404, a UMTS Terrestrial Radio Access Network (UTRAN) 402, and User Equipment (UE) 410. In this example, the UTRAN 402 provides various wireless services including telephony, video, data, messaging, broadcasts, and/or other services. The UTRAN 402 may include a plurality of Radio Network Subsystems (RNSs) such as RNS 407, each including a respective Radio Network Controller (RNC) such as an RNC 406. Here, the UTRAN 402 may include any number of RNCs 406 and RNSs 407 in addition to the RNCs 406 and RNSs 407 illustrated herein. The RNC 406 is an apparatus responsible for, among other things, assigning, reconfiguring and releasing radio resources within the RNS 407. The RNC 406 may be interconnected to other RNCs (not shown) in the UTRAN 402 through various types of interfaces such as a direct physical connection, a virtual network, or the like, using any suitable transport network.

Communication between a UE 410 and a Node B 408 may be considered as including a physical (PHY) layer and a medium access control (MAC) layer. Further, communication between a UE 410 and an RNC 406 by way of a respective Node B 408 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the RNS 407 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. Moreover, certain applications may utilize femtocells served by a home Node B (HNB), home enhanced Node B (HeNB), femto access point (FAP), access point base station, etc. For clarity, in the illustrated example, three Node Bs 408 are shown in each RNS 407; however, the RNSs 407 may include any number of wireless Node Bs. The Node Bs 408 provide wireless access points to a CN 404 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as UE in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 410 may further include a universal subscriber identity module (USIM) 411, which contains a user's subscription information to a network. For illustrative purposes, one UE 410 is shown in communication with a number of the Node Bs 408. The downlink (DL), also called the forward link, refers to the communication link from a Node B 408 to a UE 410, and the uplink (UL), also called the reverse link, refers to the communication link from a UE 410 to a Node B 408.

The CN domain 404 interfaces with one or more access networks, such as the UTRAN 402. As shown, the core network 404 is a GSM core network. However, as those skilled in the art will recognize, the various concepts presented throughout this disclosure may be implemented in a RAN, or other suitable access network, to provide UEs with access to types of core networks other than GSM networks.

The core network 404 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 404 supports circuit-switched services with a MSC 412 and a GMSC 414. In some applications, the GMSC 414 may be referred to as a media gateway (MGW). One or more RNCs, such as the RNC 406, may be connected to the MSC 412. The MSC 412 is an apparatus that controls call setup, call routing, and UE mobility functions. The MSC 412 also includes a visitor location register (VLR) that contains subscriber-related information for the duration that a UE is in the coverage area of the MSC 412. The GMSC 414 provides a gateway through the MSC 412 for the UE to access a circuit-switched network 416. The GMSC 414 includes a home location register (HLR) 415 containing subscriber data, such as the data reflecting the details of the services to which a particular user has subscribed. The HLR is also associated with an authentication center (AuC) that contains subscriber-specific authentication data. When a call is received for a particular UE, the GMSC 414 queries the HLR 415 to determine the UE's location and forwards the call to the particular MSC serving that location.

The core network 404 also supports packet-data services with a serving GPRS support node (SGSN) 418 and a GGSN 420. GPRS, which stands for General Packet Radio Service, is designed to provide packet-data services at speeds higher than those available with standard circuit-switched data services. The GGSN 420 provides a connection for the UTRAN 402 to a packet-based network 422. The packet-based network 422 may be the Internet, a private data network, or some other suitable packet-based network. The primary function of the GGSN 420 is to provide the UEs 410 with packet-based network connectivity. Data packets may be transferred between the GGSN 420 and the UEs 410 through the SGSN 418, which performs primarily the same functions in the packet-based domain as the MSC 412 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 408 and a UE 410. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Generally, during communications between devices, closed loop transmit diversity (CLTD) schemes may be used to improve data rates while using less transmit power. One CLTD technique, e.g., beamforming, may provide improvement in user experience and system performance. In such CLTD beamforming, data and control channels may be transmitted on a dominant eigenmode (e.g. dominant virtual antenna). In one aspect, data channels may include: an enhanced dedicated physical data channel (E-DPDCH), a high speed dedicated physical data channel (HS-DPDCHs), a R99 dedicated physical data channels (R99-DPDCH), etc. Further, in one aspect, control channels may include: an enhanced dedicated physical control channel (E-DPCCH), a dedicated physical control channel (DPDCH), etc. In one aspect, two pilot channels may be transmitted on two virtual antennas.

Further, for a Node B receiver, one way to do channel estimation for demodulation of data and control channels may be to run pilot filters directly on the primary pilot channel. This process may be useful in the soft handover scenario since the non-serving Node B may have no knowledge of the beamforming vector sent by the serving Node B. As such the non-serving Node B may use the process to demodulate and decode a beamforming UE's signal. However, for a serving Node B, alternative processes for channel estimation may be used and are herein described through example aspect.

Figure 5:
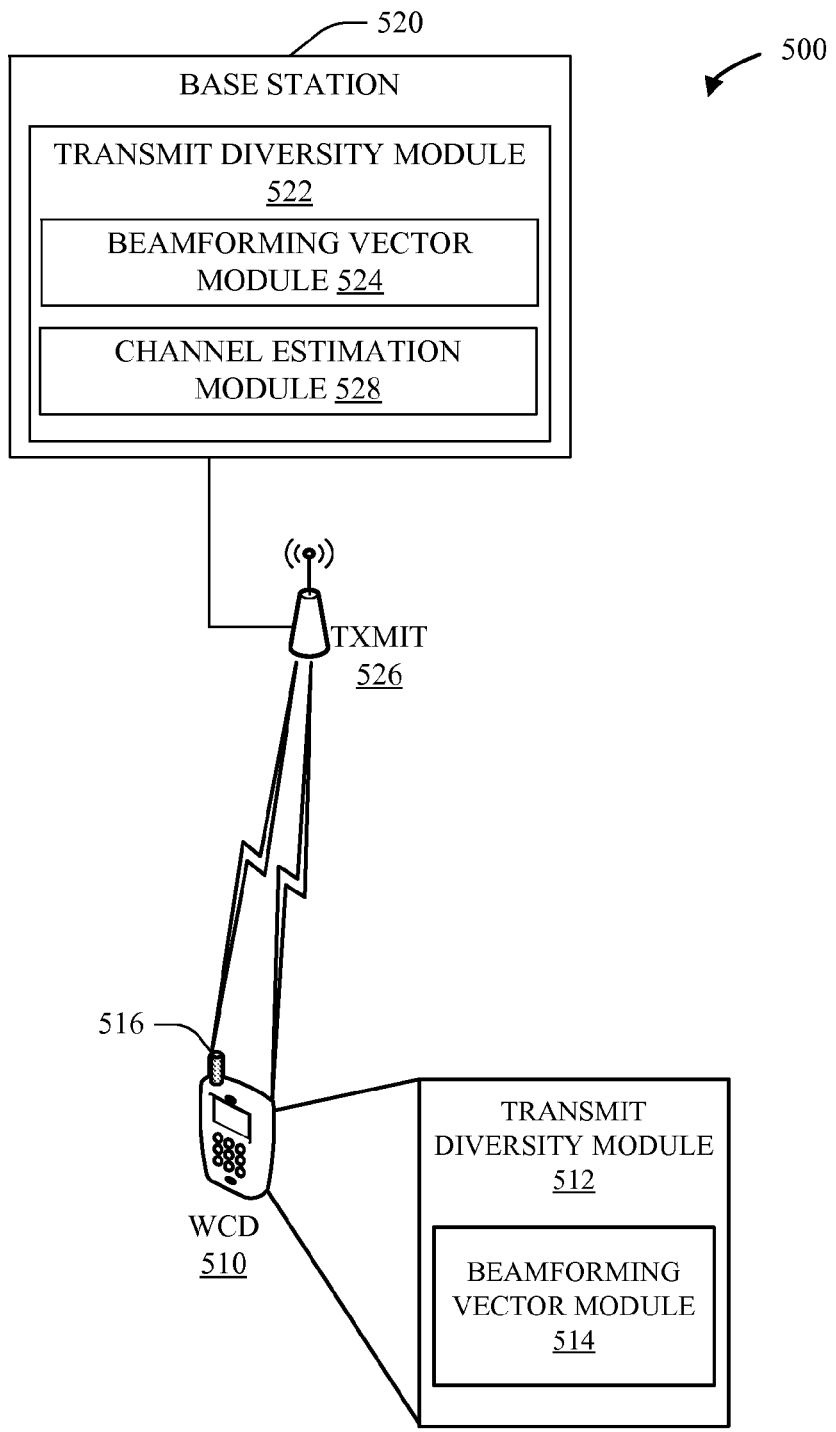
FIG. 5 is a block diagram of a system for structuring and conducting communications in a wireless communication system according to an aspect.

With reference now to FIG. 5, a block diagram of a wireless communication system 500 for enabling uplink transmit diversity using one or more beamforming is illustrated. System 500 may include one or more base stations 520 and one or more wireless communications device (e.g., terminals, UEs) 510, which can communicate via respective antennas 526 and 516. In one aspect, base station 520 may function as an E-Node B. Further, base station 520 may include transmit diversity module 522 which may be operable to implement one or more transmit diversity schemes. Still further, transmit diversity module 522 may include beamforming vector module 524 which may be operable to generate beamforming weight vectors to enabling uplink transmit diversity with beamforming Yet further, transmit diversity module 522 may include channel estimation module 528 which may be operable to reduce any impact that beamforming phase discontinuity may have on quality of channel estimates for demodulation. The methodology used in one aspect by channel estimation module 528 is described with reference to FIGS. 6 and 8.

In one aspect, UE 510 may include transmit diversity module 512 which may be operable to implement one or more transmit diversity schemes. Further, transmit diversity module 512 may include beamforming vector module 514 which may be operable to enabling beamforming using one or more received beamforming weight vectors.

In one aspect, base station 520 may conduct a downlink (DL) communication to terminal 510 via transceivers and antennas 526. At the UE 510, the DL communication may be received via antennas 516 and transceivers. In one aspect, the DL communication information may include a beamforming weight vector. In another aspect, terminal 510 may conduct an uplink (UL) communication to base station 520 via transceivers and antennas 516. At the base station 520, the UL communication may be received via antennas 526 and transceivers. In one aspect, information communicated from UE 510 to base station 520 may be transmitted using the beamforming weight vector.

In operation, a closed loop uplink transmission scheme to enable beamforming may include UE 510 transmitting multiple pilot channel signals from multiple antennas 516 to base station 520. Further, transmit diversity module 522 associated with base station 520 may receive the multiple pilot channel transmissions and estimate uplink channel values based on the received pilot channels. Beamforming vector module 524 may determine optimal phase and/or amplitude values, from the estimated uplink channel values, to maximize a received signal to noise ratio of a primary pilot channel. In one aspect the primary pilot channel is the first pilot channel. Further, beamforming vector module 524 may generate a beamforming weight vector from the determined values and may transmit the beamforming weight vector to the UE 510. In one aspect the beamforming weight vector is transmitted using a fractional dedicated physical channel (F-DPCH). Still further, UE 510 may receive the beamforming weight vector and beamforming vector module 514 may apply the beamforming weight vector information to at least one or more data channels and one or more control channels. In one aspect, data channels may include: an enhanced dedicated physical data channel (E-DPDCH), a high speed dedicated physical data channel (HS-DPDCHs), a R99 dedicated physical data channels (R99-DPDCH), etc. Further, in one aspect, control channels may include: an enhanced dedicated physical control channel (E-DPCCH), etc. Further, one or more pilot channels may be enabled using a DPCCH. Further, data and control channels may be transmitted on a dominant virtual antenna, various beamforming schemes may differ with respect to application of the beamforming information to the pilot channels. In one aspect, channel estimation module 528 may analyze received pilot channels and may demodulate the transmitted data and control channels.

Figure 6:
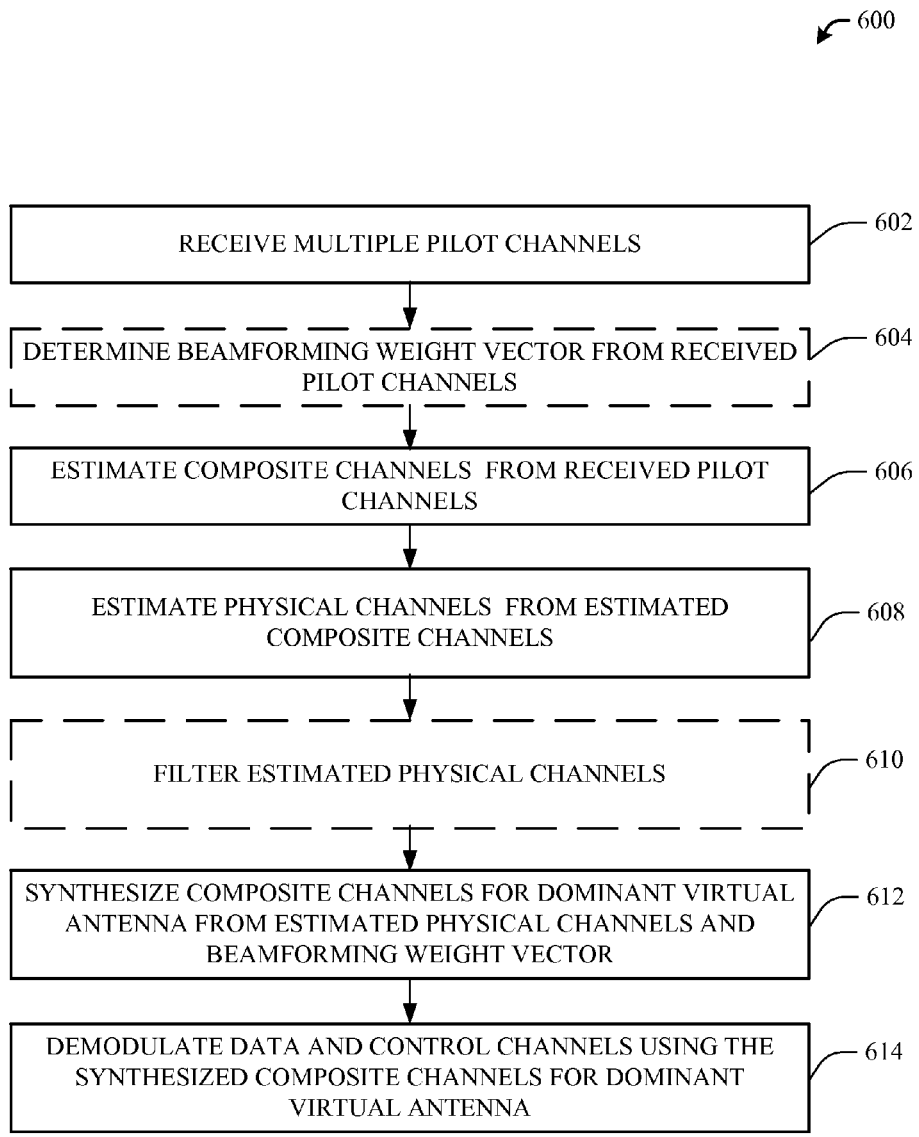
FIG. 6 is an example flow diagram of a methodology for enabling uplink beamforming transmit diversity channel estimation, according to an aspect.

FIG. 6 illustrates various methodologies in accordance with various aspects of the presented subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 6, an example method 600 for enabling uplink beamforming transmit diversity channel estimation is illustrated. Generally, at reference numeral 602 a node B may receive multiple pilot channel signals from a UE. In one aspect, the multiple pilot channels may be associated with multiple physical channels. In one aspect, optionally, at reference numeral 604 the node B may determine beamforming weight information and generate a beamforming weight vector for transmission to the UE. At reference numeral 606, the node B may estimate composite channel values from the received pilot channels. In one aspect, for Node B receive antenna indexed as r=1, 2, the values $\hat{h}_{P_1,r,k,I}$, $\hat{h}_{P_1,r,k,Q}$, $\hat{h}_{P_2,r,k,I}$, $\hat{h}_{P_2,r,k,Q}$ may represent per slot channel estimates obtained from the received pilot channels (e.g. primary pilot P1 and secondary pilot P2), where k is a finger index and I and Q indicate the in-phase and quadrature components. In other words, $\hat{h}_{P_1,r,k,I}$, $\hat{h}_{P_1,r,k,Q}$, $\hat{h}_{P_2,r,k,I}$, $\hat{h}_{P_2,r,k,Q}$ may be defined as channel estimates for the composite channels of two virtual antennas. At reference numeral 608, the node B may estimate physical channel values from the channel estimates for the composite channels. In one aspect, to recover the underlying physical channels, the above described values may be transformed using the following equations 1-4:

$$\hat{h}_{r,1,k,I} = \frac{(\hat{h}_{P_1,r,k,I} + \hat{h}_{P_2,r,k,I}/\alpha)}{2a_1} \tag{1}$$

-continued $$\hat{h}_{r,2,k,I} = \frac{(\hat{h}_{P_1,r,k,I} - \hat{h}_{P_2,r,k,I}/\alpha)}{2a_2}e^{-j\theta} \quad (2)$$

$$\hat{h}_{r,1,k,Q} = \frac{(\hat{h}_{P_1,r,k,Q} + \hat{h}_{P_2,r,k,Q}/\alpha)}{2a_1} \quad (3)$$

$$\hat{h}_{r,2,k,Q} = \frac{(\hat{h}_{P_1,r,k,Q} - \hat{h}_{P_2,r,k,Q}/\alpha)}{2a_2}e^{-j\theta} \quad (4)$$

Equations 1-4 may be applied for r=1, 2 to determine per slot physical channel estimates. In one aspect, optionally, at reference numeral 610 these per slot physical channel estimate values may be further filtered to increase an observed signal-to-noise ratio. In one such aspect, the values may be averaged over multiple slots.

At reference numeral 612, the node B may synthesize composite channel value for the dominant virtual antenna. In one aspect, for slot [n], the composite channel may be synthesized by using equations 5 and 6, as follows:

$$\tilde{h}_{P_1,r,k,I}[n]=a_1[n]\breve{h}_{r,1,k,I}[n]+a_2[n]e^{j\Theta[n]}\breve{h}_{r,2,k,I}[n] \quad (5)$$

$$\tilde{h}_{P_1,r,k,Q}[n]=a_1[n]\breve{h}_{r,1,k,Q}[n]+a_2[n]e^{j\Theta[n]}\breve{h}_{r,2,k,Q}[n] \quad (6)$$

As used in equations 5 and 6, $a_1$ and $a_2$ may be amplitude values for the beamforming vector and the beamforming phase is denoted by $\theta$. where the beamforming weight vector may be denoted as $[a_1[n], a_2[n]e^{j\Theta[n]}]$. In one aspect, the beamforming weight vector may have been transmitted to the UE earlier. The application of the beamforming weight vector may be further discussed with reference to FIG. 7. At reference numeral 614, the node B may demodulate data and control channels using the synthesized composite channel values for the dominant virtual antenna. As such, composite channel values may be obtained while reducing any impact that beamforming phase discontinuity may have on the quality of channel estimates.

Figure 7:
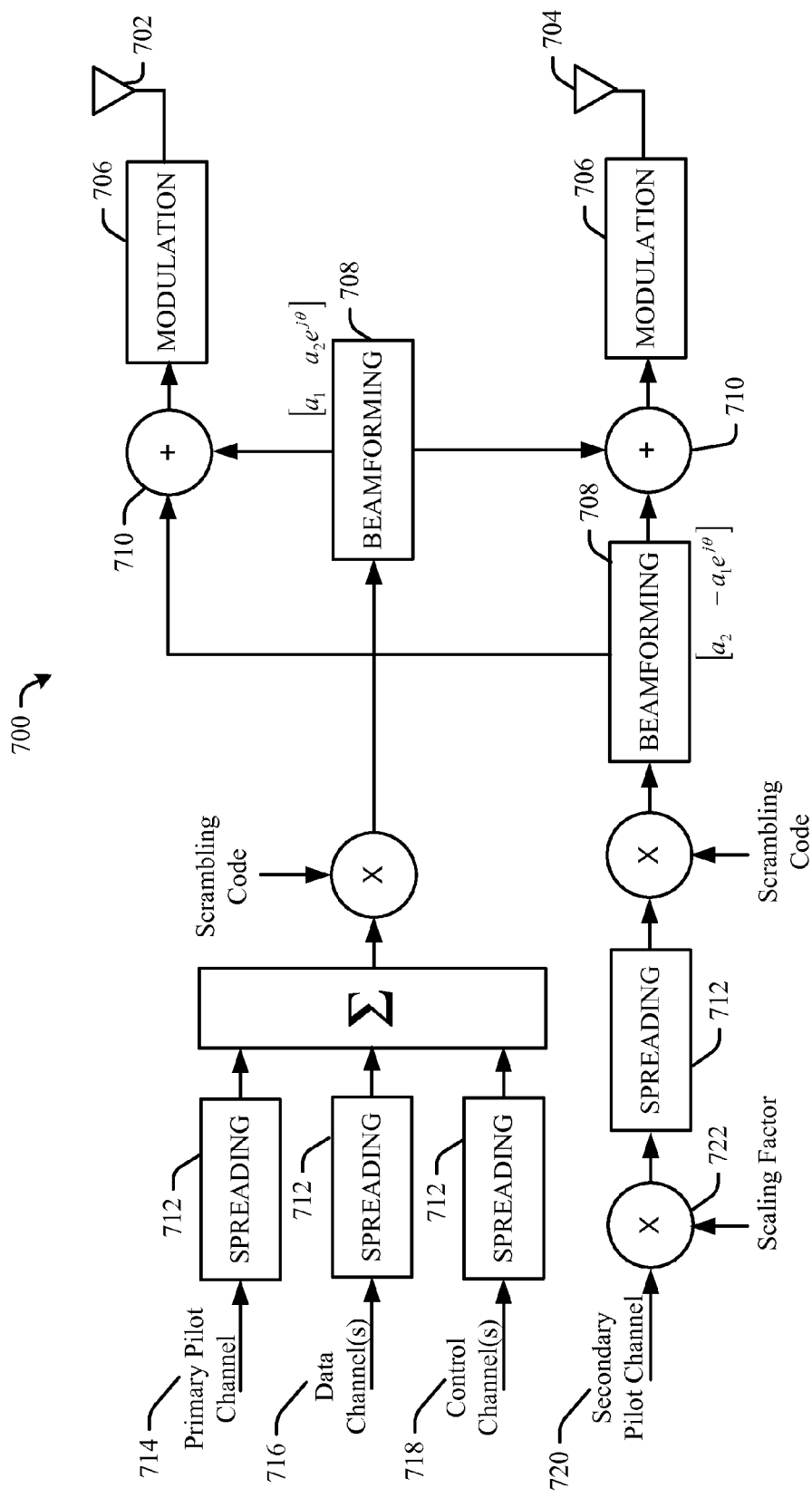
FIG. 7 depicts an example block diagram for enabling uplink beamforming transmit diversity channel estimation according to an aspect.

Turning now to FIG. 7 an example block diagram for implementing an uplink beamforming transmit diversity scheme is illustrated. In the depicted aspect, an example UE 700 is illustrated. UE 700 may include multiple antennas (702, 704) accessed through modulation units 706. Further, UE 700 may include one or more beamforming modules 708 operable to apply a beamforming weight vector and/or beamforming weight information derived from the beamforming weight vector. Further, spreading module 712 may apply spreading factors to various channels, such as a primary pilot channel 714, one or more data channels 716, one or more control channels 718 and a secondary pilot channel 720. In one aspect, data channels 716 may include: an enhanced dedicated physical data channel (E-DPDCH), a high speed dedicated physical data channel (HS-DPDCHs), a R99 dedicated physical data channels (R99-DPDCH), etc. Further, in one aspect, control channels 718 may include: an enhanced dedicated physical control channel (E-DPCCH), etc.

As depicted in FIG. 7, data channels 716 and control channels 718, and the primary pilot channel 714 may be transmitted on a dominant virtual antenna using a the beamforming weight vector signaled by a Node B via downlink control channel, and the secondary pilot channel 720 may be transmitted on a weaker virtual antenna In such aspect, a beamforming vector associated with the dominant virtual antenna may be represented as $[a_1\ a_2e^{j\Theta}]$, where $a_1^2+a_2^2=1$, and the beamforming phase is denoted by $\theta$. In one aspect, the beamforming phase $\theta$ may be quantized into a finite set, such as {0, 90, 180, 270} degrees. Similarly, in another aspect the amplitude variables $[a_1\ a_2]$ may belong to a finite set.

Further, scaling factor 722 may be applied to the secondary pilot channel 720. In such an aspect, to achieve a tradeoff between channel estimation, at the Node B receiver, and transmit power overhead due to the introduction of the secondary pilot channel, a nonnegative scaling factor $\alpha$ 722, which is smaller than one, may be introduced.

In one aspect, a beamforming vector associated with a weaker antenna, or virtual antenna, may be represented as $[a_2 - a_1 e^{j\Theta}]$. In one aspect, the beamforming vector associated with the weaker antenna 704 may have a phase 180 degrees shifted relative to the beamforming vector associated with the dominant antenna 702.

In operation, application of the beamforming vector to a baseband signal transmitted on the first antenna 702 may be represented as: $[\beta_c x_{p_1}(n)+\beta_d x_d(n)+\beta_{ec} x_{ec}(n)+\beta_{ed} x_{ed}(n)+\beta_{hs} x_{hs}(n)] \cdot a_1 \cdot s(n)+\alpha\beta_c x_{p_2}(n) \cdot a_2 \cdot s(n)$, and a base band signal transmitted on a second antenna 704 may be represented as: $[\beta_c x_{p_1}(n)+\beta_d x_d(n)+\beta_{ec} x_{ec}(n)+\beta_{ed} x_{ed}(n)+\beta_{hs} x_{hs}(n)] \cdot a_2 e^{j\Theta} \cdot s(n)+\alpha\beta_c x_{p_2}(n) \cdot (-a_1 e^{j\Theta}) \cdot s(n)$ where n is the chip index and x(n) with the subscripts c, d, ec, hs, ed may represent DPCCH, DPDCH, E-DPCCH, HS-DPCCH and E-DPDCH channel, respectively. The variable $\beta$ along with appropriate subscript denotes the gain factor for a particular channel, and s(n) is the scrambling sequence.

Figure 8:
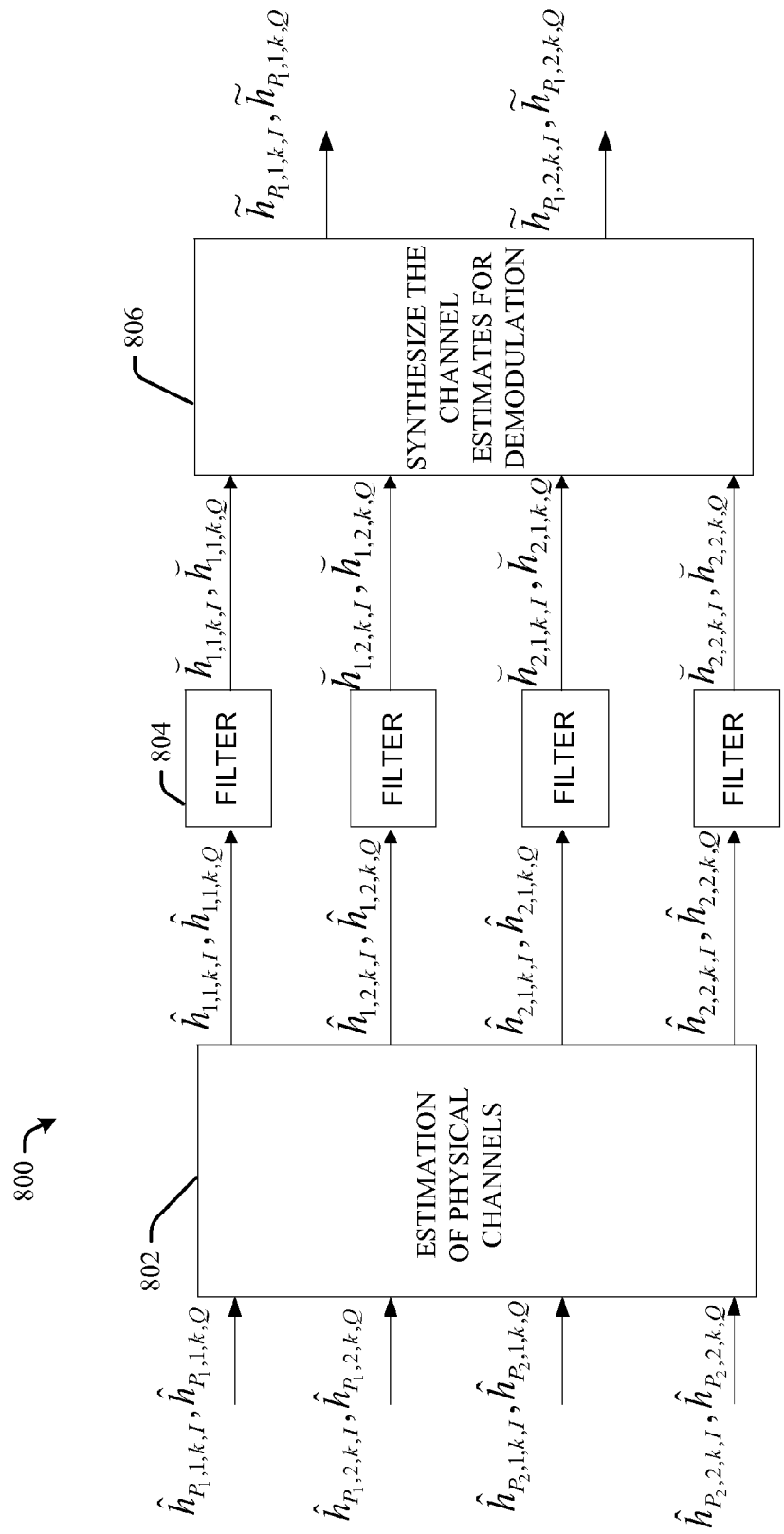
FIG. 8 depicts an example block diagram for implementing channel estimation for an uplink beamforming transmit diversity scheme according to an aspect.

Turning now to FIG. 8 an example block diagram for implementing channel estimation for an uplink beamforming transmit diversity scheme is illustrated. In the depicted aspect, primary and secondary pilot channel signals may be received. As discussed above with reference to FIG. 6 for Node B receive antenna indexed as r=1, 2, the values $\hat{h}_{P_1,r,k,I}$, $\hat{h}_{P_1,r,k,Q}$, $\hat{h}_{P_2,r,k,I}$, $\hat{h}_{P_2,r,k,Q}$ may a represent per slot channel estimates obtained from the received pilot channels (e.g. primary pilot P1 and secondary pilot P2), where k is a finger index and I and Q indicate the in-phase and quadrature components. Further, as depicted, such received pilot channel signals may be used to estimate the underlying physical channels, at 802, using equations 1-4, described with reference to FIG. 6. At 804, the derived physical channel values may be further filtered to increase an observed signal-to-noise ratio. In one such aspect, the values may be averaged over multiple slots. Thereafter, the composite channels may be synthesized 806 from the physical channel values and the beamforming weight vector described with reference to FIG. 7.

Figure 9:
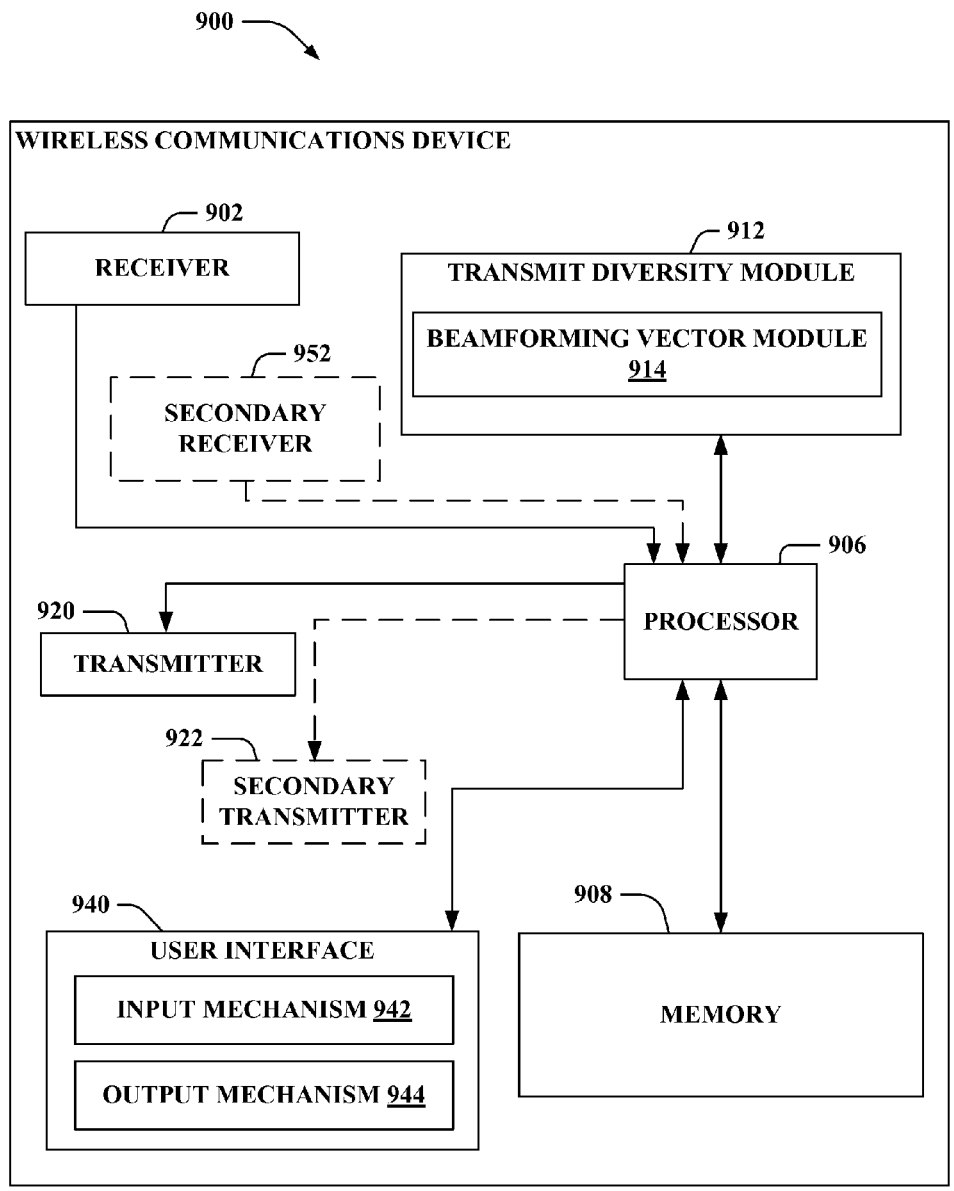
FIG. 9 depicts a block diagram of an example wireless communications device for enabling uplink beamforming transmit diversity channel estimation according to an aspect.

With reference now to FIG. 9, an illustration of a wireless communications device 900 (e.g. a client device) that enables uplink transmit diversity using one or more beamforming schemes is presented. Client device 900 comprises receiver 902 that receives one or more signal from, for instance, one or more receive antennas (not shown), performs typical actions on (e.g., filters, amplifies, downconverts, etc.) the received signal, and digitizes the conditioned signal to obtain samples. Receiver 902 can comprise an oscillator that can provide a carrier frequency for demodulation of the received signal and a demodulator that can demodulate received symbols and provide them to processor 906 for channel estimation. In one aspect, client device 900 may further comprise secondary receiver 952 and may receive additional channels of information.

Processor 906 can be a processor dedicated to analyzing information received by receiver 902 and/or generating information for transmission by one or more transmitters 920 (for ease of illustration, only transmitter 920 and an optional secondary transmitter 922 are shown), a processor that controls one or more components of client device 900, and/or a processor that both analyzes information received by receiver 902 and/or receiver 952, generates information for transmission by transmitter 920 for transmission on one or more transmitting antennas (not shown), and controls one or more components of client device 900. In one aspect, client device 900 may further comprise secondary transmitter 922 and may transmit additional channels of information.

Client device 900 can additionally comprise memory 908 that is operatively coupled to processor 906 and that can store data to be transmitted, received data, information related to available channels, data associated with analyzed signal and/or interference strength, information related to an assigned channel, power, rate, or the like, and any other suitable information for estimating a channel and communicating via the channel. Memory 908 can additionally store protocols and/or algorithms associated with estimating and/or utilizing a channel (e.g., performance based, capacity based, etc.).

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 908 of the subject systems and methods is intended to comprise, without being limited to, these and any other suitable types of memory.

Client device 900 can further comprise transmit diversity module 912 to enable transmit diversity communications. Transmit diversity module 912 may further include beamforming vector module 914 to process received beamforming weight vectors and apply beamforming information to at least one of data channels, control channels, or multiple pilot channels. In one aspect, data channels may include: an enhanced dedicated physical data channel (E-DPDCH), a high speed dedicated physical data channel (HS-DPDCHs), a R99 dedicated physical data channels (R99-DPDCH), etc. Further, in one aspect, control channels may include: an enhanced dedicated physical control channel (E-DPCCH), a dedicated physical control channel (DPDCH), etc. Further, one or more pilot channels may be enabled using one or more DPCCHs. Further, data and control channels may be transmitted on a dominant virtual antenna, various beamforming schemes may differ with respect to application of the beamforming information to the pilot channels.

Additionally, mobile device 900 may include user interface 940. User interface 940 may include input mechanisms 942 for generating inputs into wireless device 900, and output mechanism 942 for generating information for consumption by the user of wireless device 900. For example, input mechanism 942 may include a mechanism such as a key or keyboard, a mouse, a touch-screen display, a microphone, etc. Further, for example, output mechanism 944 may include a display, an audio speaker, a haptic feedback mechanism, a Personal Area Network (PAN) transceiver etc. In the illustrated aspects, output mechanism 944 may include a display operable to present media content that is in image or video format or an audio speaker to present media content that is in an audio format.

Figure 10:
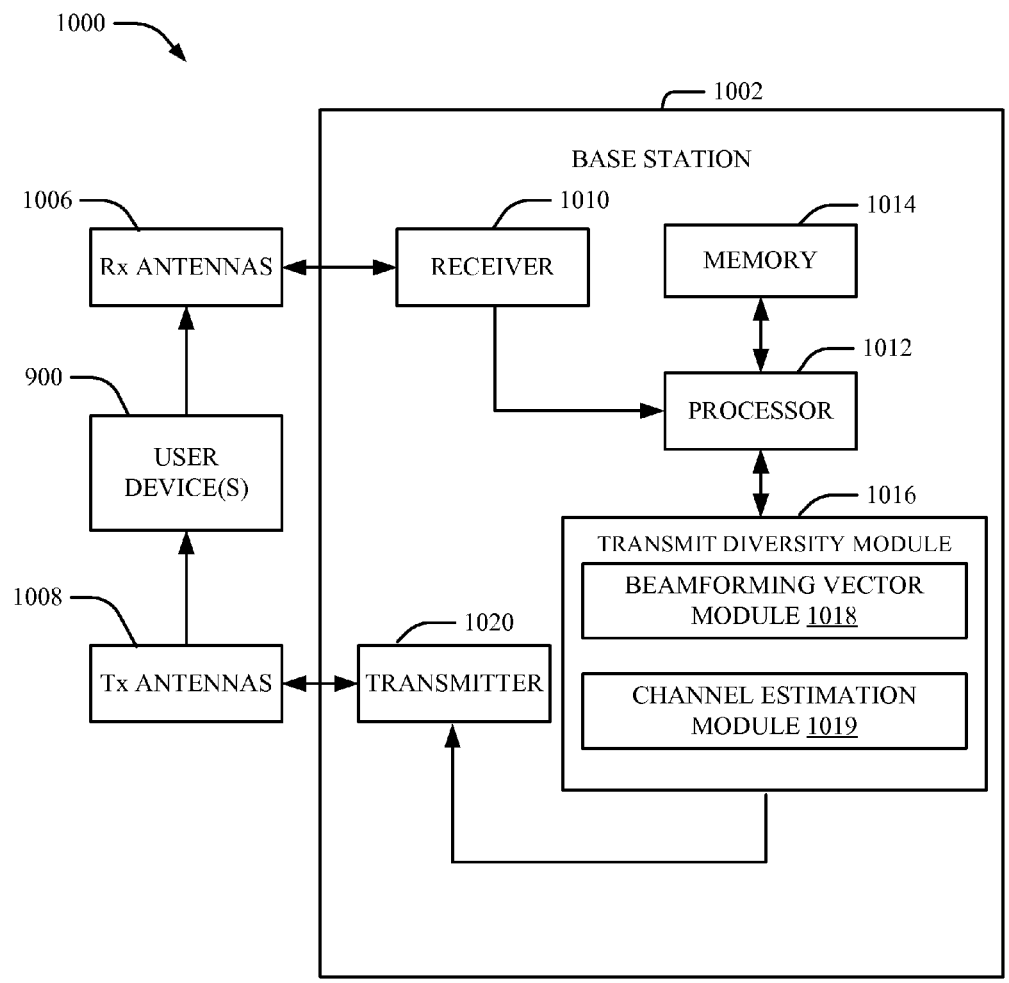
FIG. 10 is a block diagram depicting the architecture of a base station configured to enable uplink beamforming transmit diversity channel estimation, according to another aspect herein described.

With reference to FIG. 10, an example system 1000 that comprises a base station 1002 with a receiver 1010 that receives signal(s) from one or more user devices 900, through a plurality of receive antennas 1006, and a transmitter 1020 that transmits to the one or more user devices 900 through a plurality of transmit antennas 1008. Receiver 1010 can receive information from receive antennas 1006. Symbols may be analyzed by a processor 1012 that is similar to the processor described above, and which is coupled to a memory 1014 that stores information related to wireless data processing. Processor 1012 is further coupled to a transmit diversity module 1016 that facilitates processing signals received from transmit diversity enabled user devices 900. In one aspect, transmit diversity module 1016 may process multiple received pilot channels from a user device 900. In such an aspect, transmit diversity module 1016 further include beamforming vector module 1018 operable for determine optimal phase and/or amplitude values, from the estimated uplink channel values, to maximize a received signal to noise ratio of a primary pilot channel. In one aspect the primary pilot channel is the first pilot channel. Further, beamforming vector module 1018 may generate a beamforming weight vector from the determined values and may transmit the beamforming weight vector to the UE 900. In one aspect, the beamforming weight vector is transmitted using a fractional dedicated physical channel (F-DPCH). Signals may be multiplexed and/or prepared for transmission by a transmitter 1020 through one or more transmit antennas 1008 to user devices 900. In one aspect, transmit diversity module 1016 may include channel estimation module 1019 which may be operable to reduce any impact that beamforming phase discontinuity may have on quality of channel estimates for demodulation. In one aspect, channel estimation module 1019 may analyze received pilot channels and may demodulate the transmitted data and control channels. The methodology used, in one aspect, by channel estimation module 1019 is described with reference to FIGS. 6 and 8.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of enabling channel estimation by a base station, comprising:
   receiving a primary pilot channel and a secondary pilot channel;
   deriving two or more composite channels from the received primary and secondary pilot channels;
   deriving two or more physical channels from the derived two or more composite channels; and
   synthesizing a composite channel estimate for a dominant virtual antenna from the two or more derived physical channels and a beamforming weight vector.

2. The method of claim 1, further comprising:
   receiving data and control channels from a user equipment; and
   demodulating the data and control channels using the synthesized composite channel estimate.

3. The method of claim 1, further comprising:
   averaging at least one of the derived physical channels over multiple slots.

4. The method of claim 1, wherein the received primary and secondary pilot channels are time aligned.

5. The method of claim 1, further comprising:
   generating the beamforming weight vector from the received primary and secondary pilot channels.

6. The method of claim 5, wherein the beamforming weight vector is generated to maximize a signal to noise ratio for received data and control channels.

7. The method of claim 1, wherein beamforming weight vector includes at least one of phase or amplitude information.

8. The method of claim 7, wherein the phase information includes a selection of one of a finite set of available phases including 0 degrees, 90 degrees, 180 degrees and 270 degrees.

9. The method of claim 1, further comprising transmitting the beamforming weight vector to a UE, wherein the beamforming weight vector is transmitted using a fractional dedicated physical channel.

10. The method of claim 1, wherein the synthesized composite channel estimate for the dominant virtual antenna reduces beamforming phase discontinuity effects.

11. A non-transitory computer-readable medium embodied with code for causing a computer to perform operations, the operations comprising:
    receive a primary pilot channel and a secondary pilot channel;
    derive two or more composite channels from the received primary and secondary pilot channels;
    derive two or more physical channels from the derived two or more composite channels; and
    synthesize a composite channel estimate for a dominant virtual antenna from the two or more derived physical channels and a beamforming weight vector.

12. The non-transitory computer-readable medium of claim 11, further embodied with code for causing a computer to perform operations, the operations further comprising:
    receive data and control channels from a user equipment; and
    demodulate the data and control channels using the synthesized composite channel estimate.

13. The non-transitory computer-readable medium of claim 11, further embodied with code for causing the computer to perform operations, the operations further comprising: average at least one of the derived physical channels over multiple slots.

14. The non-transitory computer readable medium of claim 11, wherein the received primary and secondary pilot channels are time aligned.

15. The non-transitory computer-readable medium of claim 11, further embodied with code for causing the computer to perform operations, the operations further comprising: generate the beamforming weight vector from the received primary and secondary pilot channels.

16. The non-transitory computer readable medium of claim 15, wherein the beamforming weight vector is generated to maximize a signal to noise ratio for received data and control channels.

17. The non-transitory computer readable medium of claim 11, wherein beamforming weight vector includes at least one of phase or amplitude information.

18. The non-transitory computer readable medium of claim 17, wherein the phase information includes a selection of one of a finite set of available phases including 0 degrees, 90 degrees, 180 degrees and 270 degrees.

19. The non-transitory computer-readable medium of claim 11 further embodied with code for causing the computer to perform operations, the operations further comprising: transmit the beamforming weight vector to a UE, wherein the beamforming weight vector is transmitted using a fractional dedicated physical channel.

20. An apparatus, comprising:
  means for receiving, by a base station, a primary pilot channel and a secondary pilot channel;
  means for deriving two or more composite channels from the received primary and secondary pilot channels;
  means for deriving two or more physical channels from the derived two or more composite channels; and
  means for synthesizing a composite channel estimate for a dominant virtual antenna from the two or more derived physical channels and a beamforming weight vector.

21. The apparatus of claim 20, further comprising:
  means for receiving data and control channels from a user equipment; and
  means for demodulating the data and control channels using the synthesized composite channel estimate.

22. The apparatus of claim 20, further comprising:
  means for averaging at least one of the derived physical channels over multiple slots.

23. The apparatus of claim 20, wherein the received primary and secondary pilot channels are time aligned.

24. The apparatus of claim 20, further comprising:
  means for generating the beamforming weight vector from the received primary and secondary pilot channels.

25. The apparatus of claim 24, wherein the beamforming weight vector is generated to maximize a signal to noise ratio for received data and control channels.

26. The apparatus of claim 20, wherein beamforming weight vector includes at least one of phase or amplitude information.

27. The apparatus of claim 26 wherein the phase information includes a selection of one of a finite set of available phases including 0 degrees, 90 degrees, 180 degrees and 270 degrees.

28. The apparatus of claim 20, further comprising means for transmitting the beamforming weight vector to a UE, wherein the beamforming weight vector is transmitted using a fractional dedicated physical channel.

29. An apparatus operable in a wireless communication system, the apparatus comprising:
  a processor, configured to receive a primary pilot channel and a secondary pilot channel, derive two or more composite channels from the received primary and secondary pilot channels, derive two or more physical channels from the derived two or more composite channels, and synthesize a composite channel estimate for a dominant virtual antenna from the two or more derived physical channels and a beamforming weight vector; and
  a memory coupled to the processor for storing data.

30. The apparatus of claim 29, wherein the processor is further configured to:
  receive data and control channels from a user equipment; and
  demodulate the data and control channels using the synthesized composite channel estimate.

31. The apparatus of claim 29, wherein the processor is further configured to average at least one of the derived physical channels over multiple slots.

32. The apparatus of claim 29, wherein the received primary and secondary pilot channels are time aligned.

33. The apparatus of claim 29, wherein the processor is further configured to generate the beamforming weight vector from the received primary and secondary pilot channels.

34. The apparatus of claim 33, wherein the beamforming weight vector is generated to maximize a signal to noise ratio for received data and control channels.

35. The apparatus of claim 29, wherein beamforming weight vector includes at least one of phase or amplitude information.

36. The apparatus of claim 35, wherein the phase information includes a selection of one of a finite set of available phases including 0 degrees, 90 degrees, 180 degrees and 270 degrees.

37. The apparatus of claim 29, wherein the processor is further configured to transmit the beamforming weight vector to a UE, wherein the beamforming weight vector is transmitted using a fractional dedicated physical channel.

38. A base station, comprising:
  a receiver operable for receiving module for a primary pilot channel and a secondary pilot channel; and
  a channel estimation module for:
    deriving two or more composite channels from the received primary and secondary pilot channels;
    deriving two or more physical channels from the derived two or more composite channels; and
    synthesizing a composite channel estimate for a dominant virtual antenna from the two or more derived physical channels and a beamforming weight vector.

39. The base station of claim 38, wherein the receiver is further operable for receiving data and control channels from a user equipment; and
  wherein the channel estimation module is further operable for demodulating the data and control channels using the synthesized composite channel estimate.

40. The base station of claim 38, wherein the channel estimation module is further operable for averaging at least one of the derived physical channels over multiple slots.

41. The base station of claim 38, wherein the received primary and secondary pilot channels are time aligned.

42. The base station of claim 38, wherein the channel estimation module is further operable for generating the beamforming weight vector from the received primary and secondary pilot channels.

43. The base station of claim 42, wherein the beamforming weight vector is generated to maximize a signal to noise ratio for received data and control channels.

44. The base station of claim 38, wherein beamforming weight vector includes at least one of phase or amplitude information.

45. The base station of claim 44, wherein the phase information includes a selection of one of a finite set of available phases including 0 degrees, 90 degrees, 180 degrees and 270 degrees.

46. The base station of claim 38, further comprising:
  a transmitter operable for transmitting the beamforming weight vector to a UE, wherein the beamforming weight vector is transmitted using a fractional dedicated physical channel.

* * * * *